United States Patent
Moore

[15] 3,666,696
[45] May 30, 1972

[54] COATING COMPOSITIONS COMPRISING THE REACTION PRODUCT OF AN ORGANIC POLYISOCYANATE MODIFIED WITH A MONOHYDRIC ALCOHOL AND AN OIL MODIFIED ROSINOUS MATERIAL

[72] Inventor: James Moore, Manchester, England

[73] Assignee: Imperial Chemical Industries Limited, London, England

[22] Filed: June 11, 1970

[21] Appl. No.: 45,563

[30] Foreign Application Priority Data

June 6, 1969 Great Britain......................31,254/69

[52] U.S. Cl............................260/18 TN, 260/24, 260/25, 260/26
[51] Int. Cl..........................................................C08g 17/16
[58] Field of Search.................260/2.5 A, 18 TN, 24, 25, 26, 260/77.5 A, 77.5 TB

[56] References Cited

UNITED STATES PATENTS

| | | | |
|---|---|---|---|
| 3,242,230 | 3/1966 | Habib | 260/24 |
| 3,252,924 | 5/1966 | Merten et al. | 260/26 |
| 3,509,103 | 4/1970 | Teague et al. | 260/26 |
| 3,546,148 | 12/1970 | Diamond et al. | 260/18 |
| 3,523,093 | 8/1970 | Stamberger | 260/24 |

FOREIGN PATENTS OR APPLICATIONS

| | | | |
|---|---|---|---|
| 679,761 | 2/1964 | Canada | 260/77.5 |

*Primary Examiner*—Donald E. Czaja
*Assistant Examiner*—Eugene C. Rzucidlo
*Attorney*—Cushman, Darby & Cushman

[57] ABSTRACT

Two-pack surface-coating compositions comprising in admixture (A) an essentially di-isocyanate product which is obtained by the reaction of a polyisocyanate of functionality of at least 3 or a mixture thereof with other polyisocyanates and a monohydric alcohol of molecular weight at least 70, and (B) the reaction product of an oil selected from castor oil, hydrogenated castor oil and mixtures thereof and a hydroxyl group-containing product based on rosin.

8 Claims, No Drawings

COATING COMPOSITIONS COMPRISING THE REACTION PRODUCT OF AN ORGANIC POLYISOCYANATE MODIFIED WITH A MONOHYDRIC ALCOHOL AND AN OIL MODIFIED ROSINOUS MATERIAL

The invention relates to new coating compositions and more particularly to polyurethane-based products suitable for use as flooring compositions.

According to the invention there are provided coating compositions which comprise in admixture (A) the reaction product of an aliphatic monohydroxy compound having a molecular weight of at least 70 and a polyisocyanate having at least three isocyanate groups in the molecular or a mixture thereof with other polyisocyanates, in proportion such that the reaction product contains on average at least two isocyanate groups per molecule, and (B) a reaction product of an oil selected from castor oil, hydrogenated castor oil and mixtures thereof with a resin which is a rosinate of a metal selected from Group IIa of the Periodic Table or a condensation product of rosin with i. at least one polyhydric alcohol or ii. at least one polyhydric alcohol and at least one optionally substituted phenol/formaldehyde resol resin, or iii. at least one polyhydric alcohol and at least one α, β-unsaturated dicarboxylic acid or the anhydride thereof.

When the compositions of the invention contain hydrogenated castor oil, the latter is preferably used together with castor oil itself. It is preferred to use up to 15 percent by weight of hydrogenated castor oil based on the weight of castor oil used, but higher proportions may be used if desired.

The polyisocyanate having at least three isocyanate groups which is used may be a substantially pure compound but is more conveniently a component of a mixture of polyisocyanate compounds. As examples of such mixtures there may be mentioned the products obtained by the polymerization of a diisocyanate compound, e.g., in the presence of catalysts such as metallic salts of organic acids, metallic alcoholates or tertiary amines, or the interaction products of diisocyanates with polyhydric alcohols of functionality greater than 2, e.g., the interaction product of a diisocyanate with trimethylolpropane, glycerol or hexan-triol. The polymers or interaction products may be derived, for example from di-isocyanates such as 2,4- or 2,6- toluylenediisocyanate or mixtures of these.

A preferred mixture of polyisocyanates is that obtained by the phosgenation of the mixture of amines prepared by the reaction of primary arylamines with formaldehyde under acidic conditions.

Any primary arylamine or mixture of primary arylamines may be used in the preparation of such formaldehyde reaction products, the process being particularly applicable to primary arylamines containing a single aromatic nucleus which is unsubstituted in the position para to the amino group. A preferred arylamine is aniline, when the resulting product is essentially 4,4'-diaminodiphenylamine containing amines of higher functionality, mainly triamines.

Examples of other primary arylamines which may be used in the preparation of such amine mixtures include meta-toluidine, ortho-toluidine, para-toluidine meta-, ortho- and para-ethyl anilines and similar isomers of propyl aniline, butyl aniline and octyl aniline, ortho-, meta and para-anisidines and -phenetidines, 2,3,5-trimethyl aniline, α-naphthylamine, 2,4- and 2,6-xylidines 2,4- and 2,6-diethylanilines, 2-methyl-6-ethyl-aniline, meta-benzyl aniline, ortho- and meta- chloroanilines, para-, meta- and ortho-nitroanilines, meta-bromoaniline, 2,4,- and 2,6 -tolylene diamines, 1,5- naphthylene diamine, and ortho-and meta-phenylene diamines. The formaldehyde is conveniently used in the form of an aqueous solution, for example, the commercially available solutions of strength about 36–40 percent. It is to be understood that formaldehyde generators such as paraform and trioxane which generate formaldehyde in situ may also be used.

As examples of aliphatic monohydroxy compounds which can be used in the process of the present invention there may be mentioned simple aliphatic alcohols such as butanol, hexanol, isooctanol, nonanol, decanol and cetanol, and the polyether alcohols as obtained by the interaction of an alkylene oxide, for example, ethylene oxide or propylene oxide with an aliphatic alcohol. A preferred aliphatic mono hydroxy compound is an oxyethylated isooctanol. The reaction between the polyisocyanate and the aliphatic monohydroxy compound may be carried out either at room temperature or at an elevated temperature, and is achieved by simply mixing the two components.

As examples of rosinates of metals selected from Group IIa of the Periodic Table which may be blended with castor oil and/or hydrogenated castor oil to form component (B) of the compositions of the invention there may be mentioned calcium rosinate and barium rosinate.

As examples of polyhydric alcohols which may be condensed with rosin, either alone or together with an optionally substituted phenol/formaldehyde resol resin or an α,β-unsaturated dicarboxylic acid or the anhydride thereof, to form the resinous part of component (B) there may be mentioned glycerol, pentaerythritol, trimethylolpropane and sorbitol.

By resol resins we mean the alkaline catalised reaction products of 1 mole of a phenol with at least 1 mole of formaldehyde. The most commonly used phenol for use in the preparation of resol resins is phenol itself, but other phenols and alkyl substituted phenols, for example, p-butylphenol, p-octylphenol and p-alkyl substituted phenols generally may also be used.

As examples of α,β-unsaturated dicarboxylic acids and anhydrides thereof which may be condensed with rosin together with a polyhydric alcohol as defined above there may be mentioned maleic acid, fumaric acid and maleic anhydride.

The reaction together of the castor oil and/or hydrogenated castor oil and the resin as defined above is carried out hot, suitable conditions being 235°–240° C. for ½–2 hours.

Alternatively, when both castor oil and hydrogenated castor oil are to be used, the reaction may be carried out in two stages wherein the resin and the castor oil are first reacted together at 235°–240° C. as defined above, and the hydrogenated castor oil is added to the product at a lower temperature, for example, 120° C., and the reaction is completed at the lower temperature.

The castor oil and/or hydrogenated castor oil and resin may be used in the proportions of from 99:1 to 1:99 parts by weight, the preferred range being from 95:5 to 20:80 parts by weight.

In the case wherein component (B) contains a high proportion of castor oil and/or hydrogenated castor oil relative to that of the resin, the composition of the invention can, if desired, be made up and applied in the absence of solvent. If a high resin/castor oil and/or hydrogenated castor oil ratio is employed, however, the use of a solvent may be necessary. Suitable solvents are those which are inert to isocyanate groups, for example, hydrocarbons, chlorohydrocarbons, esters and ketones. As specific examples of suitable solvents there may be mentioned ethyl acetate, butyl acetate, ethoxyethyl acetate, butoxyethyl acetate, methyl-ethyl ketone, cyclohexanone, methylisobutylketone, 4-methoxy-4-methyl-pentan-2-one, toluene, xylene, the isomeric trimethylbenzenes and mixtures of these solvents.

The compositions of the invention may also contain other additives, for example, pigments, fillers, sand and aggregate, moisture scavengers, regulators, flow agents and other additives which may be deemed necessary to obtain specific properties.

Coatings obtained from the composition of the invention are tough and have good scuff resistance. The compositions derived from castor oil alone are generally self-levelling and are particularly suitable for seamless flooring applications. Those derived at least in part from hydrogenated castor oil tend to be thixotropic and in some cases may be applied in thick coatings on vertical surfaces without sagging, a property which makes them valuable for use as roofing compositions and for similar applications. The compositions also have a good pot life. When coating a floor or other substrate, the composition is simply applied to the substrate by any suitable means and allowed to cure.

The invention is illustrated but not limited by the following Examples in which parts and percentages are by weight.

EXAMPLE 1

Component A 100 parts of a polyisocyanate composition obtained by phosgenating crude diamino diphenylmethane containing amines of higher functionality, prepared by condensing formaldehyde and aniline in the presence of hydrochloric acid are mixed with 50 parts of an oxyethylated isooctanol having an hydroxyl value of 36 mg. KOH/g. The resultant mixture is allowed to react at room temperature for at least 48 hours before use.

Component B 320 parts of 1st Pressings castor oil are heated together with 80 parts of an esterified rosin-modified phenol formaldehyde resol resin at 240° C. for 45 minutes. The latter ingredient is the glycerol ester of the product from the reaction between rosin and a diphenylolpropane-formaldehyde resol resin.

Preparation and Use of a Coating Composition 100 parts of Component B are mixed with 75 parts of component A and then applied by brush, trowel or other suitable applicator to the pre-prepared substrate.

The above composition cures overnight at normal temperatures to a tough, scuff-resistant film. The composition is usually trowel applied to give an even coating and allowed to self-level.

Example 2

Component A

20 Parts of a polyether alcohol and 19 parts of a polyisocyanate, both obtained as described below, are mixed with 35 parts of 4-methoxy-4-methylpentan-2-one and the mixture is allowed to stand for 24 hours in a sealed container.

Component B

As used in Example 1 above.

Preparation and Use of a Coating Composition 50 parts of component A are mixed with 5 parts of component B and the lacquer so obtained is applied by brush or other suitable applicator to the pre-prepared substrate. The composition cures in about 4 hours at normal temperatures to give a coating suitable for floors.

The polyether alcohol used in this Example can be obtained as follows :

A mixture of isooctanol (2,000 parts), benzene (250 parts and potassium hydroxide (69 parts) is azeotroped for 10 hours, then the benzene is distilled off at 150° C. 312 parts of the resultant solution are heated at 100° C. under a nitrogen atmosphere and 3,800 parts of an equimolecular mixture of ethylene and propylene oxides are added during 8½hours keeping the temperature at, or just below, 110° C. The mixture is stirred at this temperature for 1 hour after the addition is complete and then for a further 30 minutes at a pressure of 15 mm. Adipic acid (6.25 parts) and water (120 parts) are added and the mixture is stirred at 100° C. for 5 minutes. 41 parts of activated carbon are added and the mixture is heated in vacuo at 80° to 100° C. for 1½hours and then filtered hot.

The product has a hydroxyl value of 36 mg.KOH/gm. and an acid value of 0.5 mgKOH/gm.

The polyisocyanate used in the preparation of component A is obtained as follows :

995 parts of a mixture of 80 percent 2,4- and 20 percent 2,6- tolylene diisocyanate, 6 parts of lead naphthenate and 1,010 parts of ethyl acetate are stirred and heated under an inert atmosphere at 75°–77° C. until the isocyanate value has dropped to 11.2 percent. A solution of 0.05 part of phosphoric acid in 5 parts of ethyl acetate is added and the mixture is stirred for a further 1 hour.

EXAMPLE 3

Component A

As used in Example 1 above.

Component B 320 parts of 1st Pressings castor oil are heated together with 80 parts of an esterified rosin-modified phenol formaldehyde resol resin (as defined in Example 1 ) at 240° C. for 45 minutes. 100 parts of the resulting product are then heated together with 15 parts of hydrogenated castor oil to 120° C., stirring until solution is complete.

Preparation and Use of a Coating Composition 100 parts of the above Component B are mixed with 75 parts of Component A and the composition is then applied by brush, trowel or other suitable applicator to a pre-prepared vertical or sloping substrate. There is little or no sagging even when applied in thick coatings (0.01–0.02 inches). The composition cured during 16 hours at normal temperatures to give a tough coating.

What I claim is:

1. Coating compositions which are the products obtained by mixing together and allowing to cure, (A) the reaction product of an aliphatic monohydroxy compound having a molecular weight of a least 70 and a member selected from the group consisting of (a) a polyisocyanate having at least three isocyanate groups in the molecule and (b) a mixture of the polyisocyanate defined in (a) with other polyisocyanates, in proportion such that the reaction product contains an average of at least two isocyanate groups per molecule and (B) a reaction product of an oil selected from the group consisting of castor oil, hydrogenated castor oil and mixtures thereof, with a resin selected from the group consisting of a rosinate of a metal selected from Group IIa of the Periodic Table and a condensation product of rosin with a member selected from the group consisting of
   i. at least one polyhydric alcohol,
   ii. at least one polyhydric alcohol and at least one optionally substituted phenol/formaldehyde resol resin, and
   iii. at least one polyhydric alcohol and at least one member selected from the group consisting of α, β-unsaturated dicarboxylic acid and the anhydride thereof.

2. Coating compositions according to claim 1 characterized in that the polyisocyanate is a mixture obtained by the phosgenation of the mixture of amines prepared by the reaction of aniline with formaldehyde under acidic conditions.

3. Coating compositions according to claim 1 characterized in that the aliphatic monohydroxy compound is an oxyethylated isooctanol.

4. Coating compositions according to claim 1 characterized in that there is used a mixture of castor oil and hydrogenated castor oil containing up to 15 percent by weight of hydrogenated castor oil based on the weight of castor oil.

5. Coating compositions according to claim 1 characterized in that the reaction product of said oil with said resin is obtained by heating the reactants together at a temperature of 235°–240° C. for one-half to 2 hours.

6. Coating compositions according to claim 1 characterized in that the reaction product of said oil and said resin is obtained by heating castor oil and said resin together at a temperature of 235°–240° C., adding hydrogenated castor oil at a lower temperature and completing the reaction at that lower temperature.

7. Coating compositions according to claim 1 characterized in the said oil and said resin are used in the proportions of from 95:5 to 20:80 parts by weight.

8. Coating compositions according to claim 1 which also contains a solvent which is inert to isocyanate groups.

* * * * *